2 Sheets—Sheet 1.

G. E. KING,

Assignor to F. H. KURSHEEDT.

Fluting-Machine.

No. 8,055. Reissued Jan. 22, 1878.

Witnesses:

A. B. Robertson

C. A. Pettit

Inventor:

Geo. Edwin King per T. J. W. Robertson

Atty.

N. PETERS, PHOTO-LITHOGRAPHER, WASHINGTON, D. C.

G. E. KING,

Assignor to F. H. KURSHEEDT,

Fluting-Machine.

No. 8,055. Reissued Jan. 22, 1878.

Witnesses;

A. B. Robertson.

L. a. Pettit

Inventor:

Geo. Edwin King per T. J. W. Robertson

Atty.

N. PETERS, PHOTO-LITHOGRAPHER, WASHINGTON, D. C.

UNITED STATES PATENT OFFICE.

GEORGE E. KING, OF NEW YORK, N. Y., ASSIGNOR TO FREDERICK H. KURSHEEDT, OF SAME PLACE.

IMPROVEMENT IN FLUTING-MACHINES.

Specification forming part of Letters Patent No. 62,492, dated February 26, 1867; Reissue No. 3,000, (Division A,) dated June 23, 1868; Reissue No. 8,055, dated January 22, 1878; application filed January 3, 1878.

*To all whom it may concern:*

Be it known that I, GEORGE EDWARD KING, of the city, county, and State of New York, have invented certain new and useful Improvements in Fluting-Machines; and I do hereby declare that the following is a full, clear, and exact description of the same, reference being had to the accompanying drawings, making a part of this specification, in which—

Figure 1:
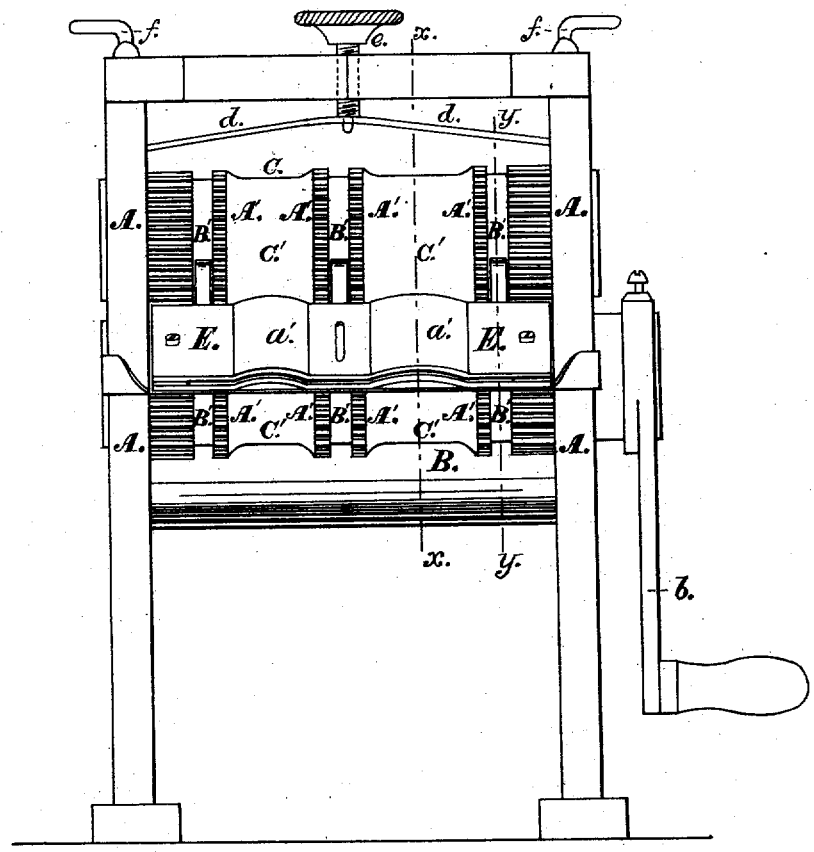
Figure 2:
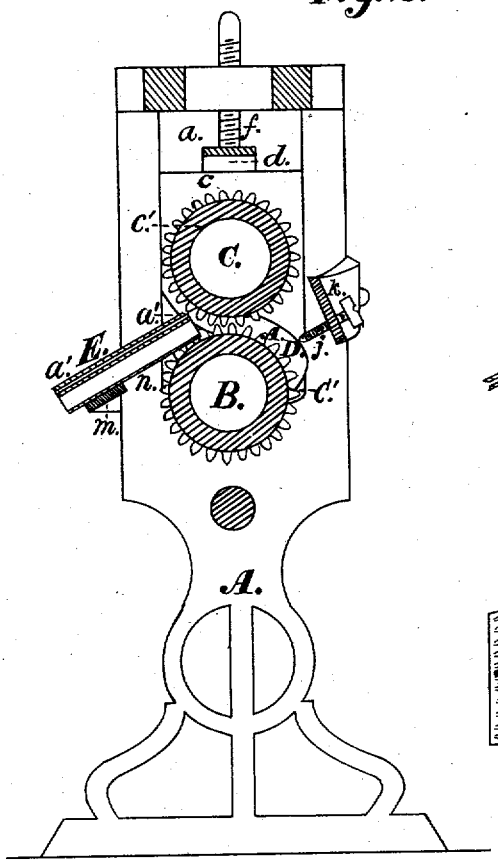
Figure 3:
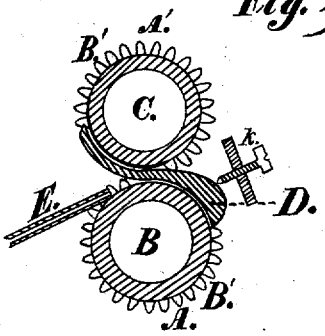
Figure 4:
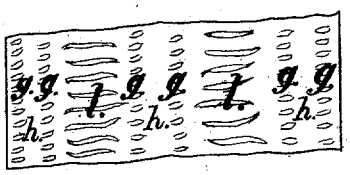
Figure 5:
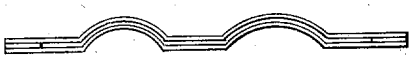

Figure 1 is a front elevation of a fluting-machine constructed according to my invention. Fig. 2 is an end elevation of the same. Fig. 3 is a detached section, representing a portion of the same. Fig. 4 is a plan view of a piece of the fluted puffing, for the manufacture of which my invention is intended. Fig. 5 is a detached view, representing a guide used in said machine.

Similar letters of reference indicate corresponding parts in all the figures.

This invention is designed for making puffing applicable to shirt-bosoms, trimming, or other purposes of dress, in which the article, as it issues from the machine, is (without having recourse to laundrying) delivered in a complete form, either single or in two or more series or rows, composed of flattened borders, with flutes running along their inner edges, and puffed or crinkled surfaces between the flutes.

The invention consists in the construction and use of a peculiar form of fluting-rollers adapted to make the puffed or crinkled surfaces above referred to, and in certain devices combined with such rollers, which will be hereinafter more fully described, and pointed out in the claims.

To enable others to understand the construction and operation of my invention, I will proceed to describe it with reference to the drawings.

A represents the frame which supports the working part of the apparatus, and situated longitudinally in the upper part of which are two fluting-rollers, B and C, which are situated one above the other, with their ends projecting through the large vertical slots *a* formed in the ends of the frame A, the roller B being supported in semicircular bearings formed in the lower ends of the slots *a*, and furnished at one end with a crank, *b*, and the upper roller C working in semicircular bearings *c'*, formed in sliding blocks *c*, placed upon the ends thereof, and pressed down upon the same by a spring, *d*, the tension of which may be regulated by means of a vertical screw, *e*, situated centrally in the top of the frame A.

When desired, the upper roller C may be held within a given distance of the lower roller by vertical set-screws *f*, situated one at each end of the top of the aforesaid frame A, and acting upon the sliding or adjustable bearings *c*.

The puffing is represented in Fig. 4, and is formed of strips of any suitable fabric, and of a width, when finished, nearly or quite equal to the length of the fluting-rollers B C, and is formed with longitudinal portions *g*, which are fluted transversely to the length of the strip aforesaid; and also with portions *h*, in which the fabric is pressed flat, and through which longitudinal rows of stitching are formed to render permanent the conformation of the puffing; and also with portions *l*, which are intended to be wider than the parts just described, and which are puffed or crinkled in such manner as to possess an irregular wavy surface.

In order to form these several portions of the puffing, each of the fluting-roller B C is formed with as many annular or circumferential series A' of grooves and flutes as there are fluted portions *g* upon the puffing, with as many narrow annular faces B' as there are flattened portions *h*, and with as many comparatively broad portions C' as there are puffed portions *l* in the finished puffing. The width of these broad portions is from one and a half to two inches or upward—that is, they must not be mere breaks in the continuity of the fluting-meshes, as in the patent of T. Robjohn, No. 39,328; but spaces broad enough to allow the passage of enough material to produce a loose fullness of the same, such portions of the material being merely gathered by the fluting at the edges, but substantially unmarked by the fluting or the regularity of pattern of the meshes. Each of the parts of the rollers is of the same width as that portion of the completed puffing which it is designed to shape, and the circumferential faces or portions C′ are of such diameter that when the two rollers are in proper position those upon one roller will be situated at such distance from those upon the other that no considerable pressure will be exerted upon the pulled portion of the fabric passing between them, and the several series A′ of grooves and flutes upon one roller will gear into those upon the other roller.

D indicates pressers, and the form of these pressers, as here represented, is such that the rearmost end of each one of which is curved downward, and fitted upon the upper rearmost part of each of the faces B′ of the lower roller B, with its forward end curved upward in contact with the forward sides of the corresponding face B′ upon the other roller, as shown in Figs. 2 and 3. The aforesaid rearmost ends of these pressers D may be pressed against the roller B by set-screws *j*, passing through a horizontal bar or brace, *k*, secured upon the rear of the frame A. Fixed upon the forward side of the frame A, in front of the roller B, is a horizontal supporting-brace, *m*, which has fixed upon it a supporting-plate, *n*. This supporting-plate is coextensive with the width of the rollers, and upon this plate is shown screwed or fastened a guide, E.

In the form shown there are two sides to this guide—an upper and lower one—secured one over the other, at such distance apart as to permit the passage of the cloth or fabric between them. The lower one is that over which the fabric is fed to the rollers; the upper one confines the fabric. The lower one, by means of its round or arched configuration, deflects from their plane of motion those portions of the fabric opposite the broad, flat, and recessed central portions of the rollers, and thereby draws in laterally a greater portion of the fabric into such plain portions. Thus the width of the fabric, if passed through the guide E between each pair of the plain recessed portions C′, will be greater if stretched out to its full extent than the width of the said portions, so that the said fabric, by means of its increased width, will have a greater fullness than would otherwise be the case, and will be puffed or crinkled in passing between the aforesaid portions C′, as will be presently fully set forth.

The end of the strip of cloth or fabric from which the fluted puffing is to be formed is passed into and through the guide E and between the rollers B C, and a rotary motion in the direction of the arrow shown in Fig. 2 is communicated to the said rollers by turning the crank *b*, or by any other suitable means. The fabric is drawn in lengthwise between the rollers, those portions thereof which pass between the several opposite series A′ of grooves and flutes of the two rollers being fluted, as shown at *g* in Fig. 4, while those portions of the said fabric which pass between the smooth narrow annular faces B′ of the rollers, being formed into gathers by the fluting of the fabric at the sides or edges thereof, are pressed flat by drawing under the pressers D, as the fabric is drawn along, at the same time that those portions of the fabric which pass between the broad, central, flat, and recessed portions are substantially unmarked by the pattern of the fluting, being only gathered or crinkled by the fluting at the edges, and thus given some fullness. At the same time such portions as have been drawn through the arched portions of the guide E will have a greater fullness of the material in said central portions from the material having been drawn in laterally. The central portions of the fabric are thus caused to assume a crinkled or puffed form as they are passed between the aforesaid smooth portions C′, the distance between the opposite smooth portions C′ aforesaid being such that no pressure is exerted upon the fabric passing between them beyond that required to simply press any fullness (which might otherwise be too loose) downward to a sufficient degree to insure the shaping thereof into the puffed condition just described. The extent to which the material will be contracted laterally, as described, as it were, or drawn up between the flutes, will be governed by the amount of deflection from a straight line of the material by the guide.

By these means the fluted puffing is brought into the form required in the finished article without the necessity of washing the same in order to bring the puffing into such form.

To complete the puffing, longitudinal rows of stitching are formed in the flat parts *h* of the puffing to retain it in shape; and, when desired, the puffing, as thus completed, may be divided longitudinally in the said parts *h*, to separate it into narrow pieces, as required, for various trimming purposes.

I do not claim a pair of fluting-rollers when such rollers have continuous meshes, or where the continuity of the meshes is merely broken by narrow spaces for inserting banding between fluted sections, for it would be impossible with rollers of these kinds to produce a loose irregular puffed strip bounded by fluting-meshes; but What I do claim is—

1. A pair of fluting-rollers having central portions flat and of diminished diameter, and broad enough to allow the passage of the material to form a puffed strip substantially unmarked by the fluting-meshes, such central portions being bounded by zones of fluting-meshes, and on each side of said zones by other flat portions, all constructed and operating substantially as described.

2. In combination, the following elements: first, a pair of fluting-rollers having broad central portions, substantially as described, bounded by narrow zones of fluting-meshes, and on each side of such zones other flat portions; second, a guide having opposite the central flat and recessed portion a curved or arched portion, or its equivalent, for deflecting the material from the plane of motion in other parts of the guide, and thereby drawing in laterally an extra fullness, all constructed and operating substantially as described.

3. In combination, the following elements: first, a pair of fluting-rollers having broad central portions, substantially as described, bounded by narrow zones of fluting-meshes, and on each side of such zones other flat portions; second, pressers bearing against the flat narrow zones; third, a guide coextensive with the width of the fabric, and provided with a curved or arched portion, or its equivalent, opposite the broad central portions of the rollers, all constructed and operating substantially as described.

GEO. E. KING.

Witnesses:
GEO. M. BAKER,
JOHN C. POSTLEY.